United States Patent [19]
Gonzalez

[11] 3,984,123
[45] Oct. 5, 1976

[54] TRAILER HITCH FOR A VEHICLE

[75] Inventor: Boris Gonzalez, Issy-Les-Moulineaux, France

[73] Assignee: Societe Anonyme Automobiles Citroen, France

[22] Filed: Mar. 24, 1975

[21] Appl. No.: 561,182

[30] Foreign Application Priority Data
Mar. 29, 1974 France .............................. 74.11471

[52] U.S. Cl. .............................. 280/483; 280/495
[51] Int. Cl.² .............................. B60D 1/06
[58] Field of Search ........... 280/400, 406 R, 406 A, 280/483, 484, 485, 486, 487, 488, 489, 500, 501, 495

[56] References Cited
UNITED STATES PATENTS

| | | | |
|---|---|---|---|
| 1,796,087 | 3/1931 | Day et al. | 280/484 |
| 3,326,574 | 6/1967 | Gibbes | 280/501 |
| 3,451,695 | 6/1969 | Tomen | 280/489 |
| 3,462,173 | 8/1969 | Bock | 280/489 |
| 3,843,162 | 10/1974 | Abromavage | 280/501 X |

Primary Examiner—M. H. Wood, Jr.
Assistant Examiner—R. Schrecengost
Attorney, Agent, or Firm—Stevens, Davis, Miller & Mosher

[57] ABSTRACT

A trailer hitch for a vehicle comprises a two-armed, V-shaped support having its apex disposed at the rear of the vehicle. The support is attached at its forward end to a chassis of the vehicle and carries at its apex a hitching ball. The chassis has a rear end terminating forwardly of a rear central part of the body of the vehicle and the chassis and body are interconnected by resilient means allowing relative longitudinal displacement of the body and chassis. The support and the body are connected together at the rearward end of the support by a flexible strip which is rigidly attached to each arm of the support and is rigidly or pivotally attached to the body, the strip permitting the said relative longitudinal displacement of the chassis and body. The flexible strip is preferably pivotally mounted on a link attached to the body by means of a mounting sleeve on a shoe attached to the strip, a damping sleeve to damp noise and vibration being received on the link within the mounting sleeve.

15 Claims, 4 Drawing Figures

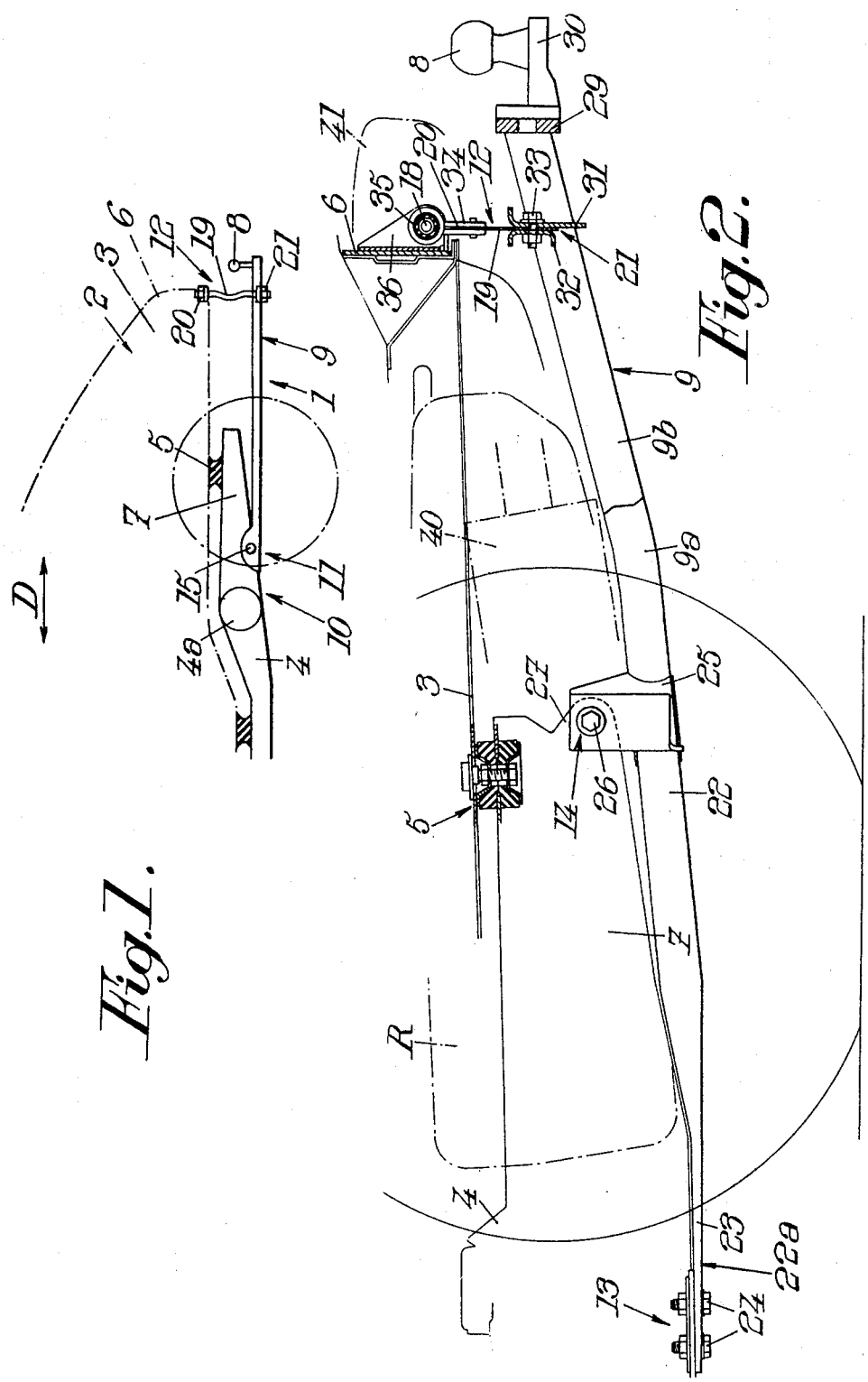

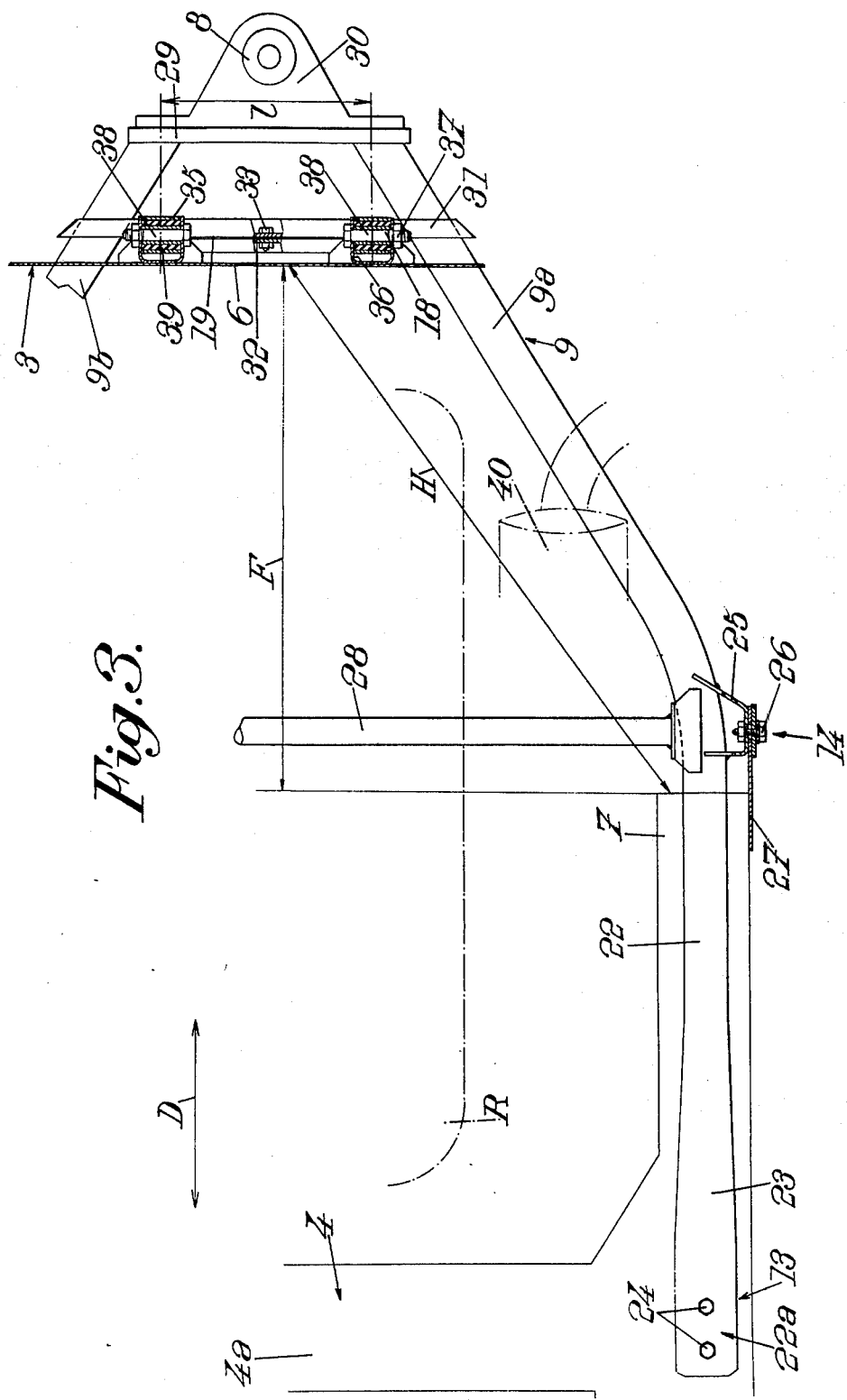

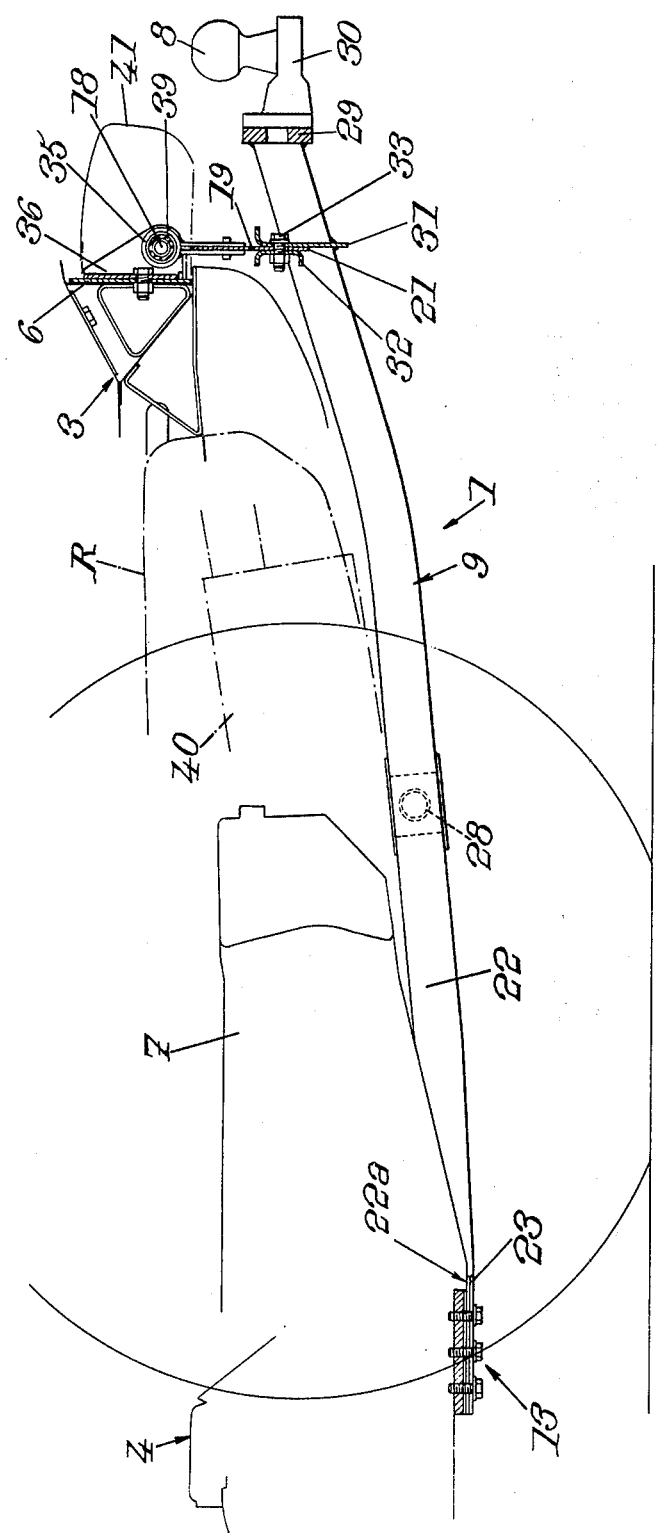

TRAILER HITCH FOR A VEHICLE

BACKGROUND OF THE INVENTION

This invention relates to a trailer hitch for a vehicle.

In particular, the invention concerns a trailer hitch for a vehicle comprising a body and a chassis interconnected via resilient means allowing relative longitudinal displacement of the body and chassis in the direction of movement of the vehicle, the chassis having a rear portion terminating forwardly of a rear central portion of said body, the hitch comprising trailer-hitching means connected to a support adjacent a rearward end of the support, the support being attached adjacent a forward end thereof to the chassis, and mobile connecting means disposed between the rear of the vehicle body and the support adjacent the rearward end of the support, such mobile connecting means being adapted to enable the relative longitudinal displacement of the body and the chassis to be freely made, such connecting means transmitting to the body only the vertical forces acting on the hitching means, while the horizontal forces are mainly transmitted to the chassis.

The invention relates more particularly, since this is the application which seems the most advantageous, but not the exclusive one, to a trailer hitch for a touring or lightweight car (loaded mass less than three tons).

SUMMARY OF THE INVENTION

It is a main object of the invention to provide a trailer hitch which meets various practical requirements more satisfactorily than hitherto, inter alia which allows the hitching means to be maintained satisfactorily inter alia in a direction perpendicular to the central longitudinal plane of the vehicle, although the hitch is of a lightweight cheap construction and does not impede possible relative displacements between the body and the chassis.

According to the invention, a trailer hitch of the kind specified is characterised in that the mobile connecting means comprise at least one substantially vertical flexible strip lying in a transverse plane perpendicular to the longitudinal direction of the vehicle and rigidly connected to at least one of said body and said support.

Preferably, the flexible strip is rigidly connected to the support. The connection between the flexible strip and the body can be rigid or pivotal.

The flexibility of the strip allows the relative longitudinal displacement between the body and the chassis without considerable forces being set up at the place of connection via the flexible strip between the support and the body.

As a rule, the support comprises two arms connected in a V-shaped configuration with the hitching means connected to the support at the apex of the V, the connecting means comprising a connection between the body and each arm of the support.

Preferably, the mobile connecting means comprises a single flexible strip extending transversely between the two arms of the support and connected to each arm.

Advantageously, the flexible strip is attached to the body with the interposition of means for damping noise and vibration between the chassis and the body, such damping means comprising, for example, an elastomeric material.

The flexible strip can be made of steel, preferably with a thickness of between 1 and 5 mm.

As a rule the dimension of the flexible strip in the direction perpendicular to the mean longitudinal plane of the vehicle is greater than 5 cm.

The support or each arm thereof is attached either at two longitudinally spaced out places on the chassis, or simply at one place on the chassis.

Generally, the distance between the central rear portion of the body and the rear portion of the chassis is greater than 50 cm.

BRIEF DESCRIPTION OF THE DRAWINGS

Other features and advantages of the invention will become apparent from the following description of preferred embodiments of the invention, given with reference to the appended drawings, in which:

FIG. 1 shows diagrammatically a trailer hitch according to the invention;

FIG. 2 shows in elevation, with portions broken away, one embodiment of a trailer hitch according to the invention;

FIG. 3 is a plan view, with parts broken away of the hitch illustrated in FIG. 2; and FIG. 4 illustrates a second embodiment.

DESCRIPTION OF PREFERRED EMBODIMENTS

FIG. 1 shows a trailer hitch 1 for a vehicle 2 whose rear part is shown only diagrammatically. The vehicle 2 comprises a body 3 and a chassis 4 connected together via resilient means 5 which enable the body 3 and the chassis 4 to be displaced relative to one another mainly in a longitudinal direction D parallel to the direction of travel of the vehicle. A vehicle of this kind is disclosed and claimed in the Applicants' French Pat. No. 2,174,325.

The body 3 extends beyond the chassis 4 at the rear of the vehicle and the rear central portion 6 (FIG. 3) of the body is spaced from the rear portion 7 of the chassis. The distance H (FIG. 3) between the portions 6 and 7 can be greater than 50 cm, while the overhang of the rear end of the body, for instance, at the rear end 7 of the chassis, which corresponds to the distance F in the longitudinal direction D (FIG. 3), is generally greater than 40 cm.

The hitch 1 comprises trailer-hitching means formed by a spherical ball and socket joint 8 connected to a support 9 borne by the substructure 10 of the vehicle. As a rule the support 9 comprises two arms 9a, 9b, (cf. FIG. 3) connected in a V-shaped configuration at whose apex the ball and socket joint 8 is disposed.

Adjacent its end 11 remote from the joint 8, the support 9 is attached to the vehicle chassis 4 and mobile connecting means 12, adapted to allow relative displacements to be made freely as between the body 3 and the chassis 4, are provided between the rear 6 of the body 3 and the support 9 towards the end of the fitting adjacent the joint 8. The connecting means 12 are adapted to transmit to the body only the vertical forces acting on the joint 8, while the horizontal forces are mainly transmitted to the chassis.

By way of example, if the vehicle 2 is a touring vehicle adapted to pull, for instance, a caravan, the horizontal forces (traction or thrust) exerted on the joint 8 can be of the order of 500 decanewtons, while the vertical forces of the joint 8 are of the order of 40 decanewtons (under static load), oriented downwards. When the assembly formed by the traction vehicle and the trailer moves, dynamic vertical forces in the upward direction may be produced, but the values of such dynamic vertical forces remain low, of the order of about 10 decanewtons.

The support 9 (or each arm thereof) can be attached at two longitudinally spaced places 13, 14 on the chassis (FIG. 2) or be fixed at a single place 15 on the chassis (FIG. 1). The mobile connecting means 12 comprise at least one substantially vertical flexible strip 19 disposed in a transverse plane perpendicular to the longitudinal direction of the vehicle. The flexible strip 19 is rigidly attached at one of its ends 21 to the support 9. The other end 20 of the flexible strip can be attached rigidly to the rear portion 6 of the body (FIG. 1). In one arrangement the plane strip 19 (FIGS. 2–4) is articulated adjacent its end 20 on a transverse pivot 18 which is therefore perpendicular to the mean longitudinal plane of the vehicle, the pivot 18 being borne by the body 3. Due to its flexibility, although the strip 19 is rigidly attached at its end 21 to the support 9, the strip enables relative longitudinal displacements to be carried out freely between the body 3 and the chassis 4, but transmits the vertical forces exerted on the joint 8 to the body 3.

The so-called ends 20, 21 of the strip 19 are in fact the top and bottom edges of the strip. The strip 19 can be attached to the support 9 and if necessary to the body, either at a number of points along the top and bottom edges 20, 21, or by flanging along the whole length of such edges. Although it is flexible, the strip 19 is nevertheless adapted to transmit to the body 3 the upwardly directed vertical forces which may be set up when the vehicle moves (upwardly orientated dynamic force). FIG. 1 shows diagrammatically and in an exaggerated manner, to facilitate understanding, the deformed strip 19. The flexible strip 19 is generally a steel strip and its thickness is preferably between 1 and 5 mm. Advantageously, the strip 19 has a dimension in the direction perpendicular to the mean longitudinal plane of the vehicle of at least 5 cm and preferably more than 10 cm.

FIGS. 2 and 3 show the rear portion of the vehicle having a hitching device embodying the invention, in which the support 9 is attached at two places 13, 14 on the chassis 4 in a manner similar to that shown in FIG. 1.

The two arms 9a, 9b of the support 9 are tubular and are continued on the side remote from the joint 8 by portions 22 substantially parallel with the mean longitudinal vertical plane of the vehicle. An end 22a of each portion 22 is thin and flat and of substantially rectangular outlines so as to form a foot 23 at the place 13 of attachment to the chassis 4. Each foot 23 is attached, for instance, by two nut and bolt assemblies 24 disposed, in the longitudinal direction D, substantially at the level of a rear cross member 4a of the chassis 4 (FIG. 3). The chassis 4 is continued at each end of the cross-member 4a by two rigid jibs forming the ends 7.

The other place 14 of attachment of each arm 9a, 9b is disposed at the end of the respective jib 7 substantially at the level of the bend formed by the arm 9a at the start of the portion 22. A bracket 25 is attached, inter alia, by welding, to each arm 9a, 9b. The bracket 25 is connected rigidly, by a nut and bolt assembly 26, to a plate 27 connected, for instance, by welding, to the jib 7. The two arms 9a, 9b are connected transversely, in the region of their inwardly curved zones adjacent the portions 22, via a tubular crossmember 28 (FIG. 3). Preferably, the cross-member is welded at each end to the respective arm.

The ends of the arms 9a, 9b adjacent the joint 8 are rigidly interconnected by a vertically disposed transverse plate 29, the ends of the arms being connected to such plate, for example, by welding. The joint 8 is mounted on a base 30 connected to the plate 29. The arms 9a, 9b project rearwards slightly beyond the rear portion 6 of the body. The arms 9a, 9b are also connected transversely by another vertical plate 31 positioned, in the longitudinal direction D, between the plate 29 and the rear end 6 of the body 3 adjacent such rear end (FIGS. 2 and 3). Plate 31 comprises adjacent its transverse ends two holes (two shown) through which the arms 9a, 9b extend, the plate 31 being advantageously welded to the arms at these points. The flexible strip 19 extends transversely between the arms 9a, 9b against the plate 31 and is rigidly attached to the plate 31; to this end, the strip 19 is clamped between the plate 31 and a parallel reinforcing plate 32 by a number of nut and bolt assemblies 33 regularly distributed in the transverse direction. The bolts extend through the plate 31, strip 19 and the reinforcing plate 32.

The upper portion of the strip 19 is articulated to pivots 18 which extend transversely, perpendicular to the mean longitudinal plane of the vehicle. To articulate the strip 19, there is provided, at each transverse end of the upper portion of the strip 19, a shoe 34 attached to the transverse end of the upper portion of the strip and having a sleeve 35 in which the pivot can engage. As shown in FIG. 3, the pivot 18 can be formed by a bolt borne by a bracket 36 attached, for example, by welding to the rear portion of the body 3. Ths support 36 has a U-shaped cross-section which is open rearwardly of the vehicle. The bolt extends through the two flanges of the bracket 36 and is retained thereon by a nut 37.

By way of numerical example, the mean transverse distance 1 (FIG. 3) between the shoes 34 is of the order of 20 cm, the transverse dimension of the strip 19 being greater than 1.

A smooth portion 38 can be provided on the bolt forming the pin 18, between the flanges of the support 36, and a sleeve 39 made of material adapted to damp noise or vibrations, e.g. a sleeve made of elastomeric material, is disposed around the portion 38 between the latter and the sleeve 35 of the shoe 34. The assembly is so designed that the strip 19 is in a vertical plane when the vehicle moves over horizontal ground.

An element made of a material adapted to damp vibrations or noise might be interposed in the region of the connections between the strip 19 and the body 2 and/or the support 9.

FIGS. 2 and 3 show, partially in chain-dot lines, a muffler 40, rear bumper 41 (FIG. 2) and fuel tank R. The position of these members in relation to the support 9 and joint 8 can clearly be gathered from the drawings. It can be seen that the arms 9a, 9b are disposed slightly below the muffler 48 and the bottom of the fuel tank R (FIG. 2) and enclose (FIG. 3) the horizontal projection of the tank R and muffler 40.

FIG. 4 shows diagrammatically another embodiment comprising means 12 similar to those shown in FIGS. 2 and 3, but in which the support 9 is attached to the chassis 4 only at a single place 13 disposed at the end of the fitting 9 remote from the joint 8. Attachment at the place 13 is preferably reinforced in relation to that shown in FIGS. 2 and 3.

The operation of a hitch according to the invention can clearly be gathered from the foregoing. The tractional and thrust forces experienced by the joint 8 are mainly transmitted by the support 9 to the chassis 4, while the vertical forces experienced by the joint 8 are transmitted to the body 3.

Although the places at which the support 9 is attached to the chassis 4 are remote from the joint 8, the support 9 can be thin and of relatively light construction and it can be anchored to the chassis 4 in a very simple manner, since the overhang of the support 9 is prevented from having any working effect by the presence of the flexible strip 19 which transmits the vertical forces to the body. The relative longitudinal movements between the body 3 and the chassis 4 are not impeded by the connecting means 12, which allow such movements to be made freely. The strip 19 also ensures that the support 9 is satisfactorily retained against transverse stressing perpendicular to the mean longitudinal plane of the vehicle.

The mobile connecting means 12 also share in filtering vibrations between the chassis and the body, not only because of their mobility and/or flexibility, but also by the interposition if necessary of a member made of elastomeric material between the mobile connecting means and the body and/or the chassis.

The sleeve 39 made of material adapted to damp noise or vibrations is trapped radially between the pivot 18 and the rigid sleeve 35 and axially between the two flanges of the U-shaped bracket 36. The sleeve 39 thus trapped ensures that the pivot 18 is retained satisfactorily, inter alia against transverse stressing.

I claim:

1. In combination with a vehicle including a body having a rear central portion, a chassis having a rear portion terminating forwardly of said rear central portion of said body, and resilient means interconnecting said body and said chassis and allowing relative longitudinal displacement of said body and chassis in the direction of movement of the vehicle, a trailer hitch, comprising:
   a support attached adjacent a forward end thereof to said chassis;
   trailer hitching means connected to said support adjacent a rearward end of said support; and
   mobile connecting means comprising at least one substantially vertical flexible strip lying in a transverse plane perpendicular to the longitudinal direction of said vehicle, said strip being rigidly connected to the rearward end of said support and pivotally connected to the rear portion of said body;
   wherein said connecting means enables said relative longitudinal displacement of said body and chassis to be freely made and transmits to said body substantially only vertical forces acting on said hitching means, horizontal forces being transmitted substantially only to said chassis.

2. A trailer hitch as claimed in claim 1, comprising a transversely extending link mounted on said body, a shoe attached to said flexible strip, a mounting sleeve on said shoe for receiving said link to connect said flexible strip pivotally to said body, and a sleeve of material for damping noise and vibrations disposed on said link within said mounting sleeve.

3. In combination with a vehicle including a body having a rear central portion, a chassis having a rear portion terminating forwardly of said rear central portion of said body, and resilient means interconnecting said body and said chassis and allowing relative longitudinal displacement of said body and chassis in the direction of movement of the vehicle, a trailer hitch, comprising:
   a support attached adjacent a forward end thereof to said chassis;
   trailer hitching means connected to said support adjacent a rearward end of said support; and
   mobile connecting means connecting said rear portion of said body to said rearward end of said support and comprising
      at least one vertical flexible strip lying in a transverse plane perpendicular to the longitudinal direction of the vehicle and rigidly connected to said body, and
      means for damping noise and vibrations disposed between and connecting said flexible strip and said body;
   wherein said connecting means enables said relative longitudinal displacement of said body and chassis to be freely made and transmits to said body substantially only vertical forces acting on said hitching means, horizontal forces being transmitted substantially only to said chassis.

4. In combination with a vehicle including a body having a rear central portion, a chassis having a rear portion terminating forwardly of said rear central portion of said body, and resilient means interconnecting said body and said chassis and allowing relative longitudinal displacement of said body and chassis in the direction of movement of the vehicle, a trailer hitch, comprising:
   a support attached adjacent a forward end thereof to said chassis;
   trailer hitching means connected to said support adjacent a rearward end of said support; and
   mobile connecting means connecting said rear portion of said body to said rearward end of said support and comprising at least one vertical flexible strip made of steel and having a thickness of from 1 mm to 5 mm lying in a transverse plane perpendicular to the longitudinal direction of the vehicle and rigidly connected to at least one of said body and said support;
   wherein said connecting means enables said relative longitudinal displacement of said body and chassis to be freely made and transmits to said body substantially only vertical forces acting on said hitching means, horizontal forces being transmitted substantially only to said chassis.

5. In combination with a vehicle including a body having a rear central portion, a chassis having a rear portion terminating forwardly of said rear central portion of said body, and resilient means interconnecting said body and said chassis and allowing relative longitudinal displacement of said body and chassis in the direction of movement of the vehicle, a trailer hitch, comprising:
   a support attached adjacent a forward end thereof to said chassis;
   trailer hitching means connected to said support adjacent a rearward end of said support; and
   mobile connecting means connecting said rear portion of said body to said rearward end of said support and comprising at least one vertical flexible strip having a dimension greater than 5 cm in the direction perpendicular to the mean longitudinal plane of the vehicle and lying in a transverse plane perpendicular to the longitudinal direction of the vehicle and rigidly connected to at least one of said body and said support;

wherein said connecting means enables said relative longitudinal displacement of said body and chassis to be freely made and transmits to said body substantially only vertical forces acting on said hitching means, horizontal forces being transmitted substantially only to said chassis.

6. In combination with a vehicle including a body having a rear central portion, a chassis having a rear portion terminating forwardly of said rear central portion of said body, and resilient means interconnecting said body and said chassis and allowing relative longitudinal displacement of said body and chassis in the direction of movement of the vehicle, a trailer hitch, comprising:

a support attached adjacent a forward end thereof to said chassis,
    said support comprising two arms connected in a V-shaped configuration;
trailer hitching means connected to a rearward end portion of said support adjacent the apex of the V; and
mobile connecting means connecting said rear portion of said body to said rearward end of said support and comprising a single flexible strip extending transversely between said two arms of said support and connected to each said arm, said strip lying in a tansverse plane perpendicular to the longitudinal direction of the vehicle and rigidly connected to at least one of said body and said support;
wherein said connecting means enables said relative longitudinal displacement of said body and chassis to be freely made and transmits to said body substantially only vertical forces acting on said hitching means, horizontal forces being transmitted substantially only to said chassis.

7. In combination with a vehicle including a body having a rear central portion, a chassis having a rear portion terminating forwardly of said rear central portion of said body, and resilient means interconnecting said body and said chassis and allowing relative longitudinal displacement of said body and chassis in the direction of movement of the vehicle, a trailer hitch, comprising:

a support attached adjacent a forward end thereof to said chassis;
trailer hitching means connected to said support adjacent a rearward end of said support; and
mobile connecting means comprising at least one substantially vertical flexible strip lying in a transverse plane perpendicular to the longitudinal direction of said vehicle, said strip being attached to said body and said support along its top and bottom edges to retain the support against transverse stressing perpendicular to the mean longitudinal plane of the vehicle, said strip being rigidly connected to at least one of said body and said support;
wherein said connecting means enables said relative longitudinal displacement of said body and chassis to be freely made and transmits to said body substantially only vertical forces acting on said hitching means, horizontal forces being transmitted substantially only to said chassis.

8. A trailer hitch as claimed in claim 7, wherein said flexible strip is rigidly connected to both said body and said support.

9. A trailer hitch as claimed in claim 7, wherein said support comprises two arms connected in a V-shaped configuration with said hitching means connected to said support adjacent the apex of the V, said connecting means comprising a connection between said body and each said arm of said support.

10. A trailer hitch according to claim 9 wherein each arm of the support is attached at two longitudinally spaced apart places on the chassis.

11. A trailer hitch as claimed in claim 9, wherein said vehicle comprises a rear-mounted fuel tank, said support being disposed below the bottom of said fuel tank and framing said tank in horizontal projection.

12. A trailer hitch as claimed in claim 7, wherein said central rear portion of said body is spaced at least 50 cm from said rear portion of said chassis.

13. A trailer hitch according to claim 7, wherein the support is attached at two longitudinally spaced apart places on the chassis.

14. The combination according to claim 7, wherein said flexible strip is made of metal.

15. The combination according to claim 14, wherein said metal is steel.

\* \* \* \* \*